Patented Oct. 14, 1941

2,258,741

UNITED STATES PATENT OFFICE 2,258,741

ADHESIVE AND METHOD OF PREPARING SAME

Charles H. Champion and Fred H. Denham, Westport, Conn., assignors to R. T. Vanderbilt Company, Incorporated, New York, N. Y., a corporation of New York No Drawing. Application August 13, 1938, Serial No. 224,729

6 Claims. (Cl. 106—210)

This invention relates to improvements in adhesives adapted particularly for use as laminating adhesives in the manufacture of paper board; and includes new adhesive compositions, and the method of their manufacture.

The new adhesives are composite adhesives made of enzyme-converted starch, converted to a viscosity lower than that of the desired composite adhesive, and gelatinized, unconverted starch, in such proportions that the final adhesive has the desired viscosity and other properties. The proportions of the enzyme-converted starch and of the gelatinized unconverted starch may be varied, but in general the amount of enzyme-converted starch will be materially greater than that of the gelatinized unconverted starch. For example, the starch which is gelatinized may represent from 1 to 50% of the weight of the starch which is enzyme converted.

In the use of starch paste for laminating operations we have found that a moderately thick, viscous solution is required for most laminating operations. When an attempt is made to convert starch with enzymes to produce a starch paste of regulated viscosity, it is difficult to regulate and stop the enzyme action to obtain a product of the desired viscosity and uniformity, due, for example, to considerable variation in the different kinds of starch used, the pH of the water, etc. The enzyme conversion of starch seems to have two general effects, one, that of liquefying the starch, and another that of converting the starch to maltose.

We have found that these difficulties can be overcome and composite starch paste of regulated and uniform viscosity readily produced by carrying the enzyme conversion of the starch beyond that represented by the desired viscosity to form a thin solution and by then adding a regulated amount of raw starch and gelatinizing this starch without conversion. We have found that by cooking the original mixture of starch, water and enzyme to a thin solution we can obtain any desired viscosity by varying the amount of added and gelatinized but unconverted starch.

In making the new composite adhesives a mixture of starch, water and enzyme is heated above the gelatinizing point of the starch and held at this temperature until the starch has been converted by enzyme action to a thin starch solution. The resulting mixture is then heated to a temperature at which the enzyme is destroyed, thereby preventing further enzyme action on the original starch or on the subsequently added gelatinized starch. We then cool the thin starch solution to a temperature below the gelatinizing point of the starch and add an additional quantity of raw starch and mix this in thoroughly with the cooked, enzyme converted starch solution. The temperature of this mixture is then raised to above the gelatinizing point of this added starch so as to gelatinize it and form a resulting composite adhesive of materially increased viscosity as compared with the thin, enzyme-converted starch solution.

By regulating the conversion of the starch with the enzyme and the amount of added raw starch which is subsequently gelatinized, the viscosity of the composite adhesive can be regulated and a product of uniform or regulated viscosity readily obtained.

A quantity of an alkaline substance such as borax or soda ash may be added with resulting increase of the tackiness of the composite starch paste. Such alkaline substances may be added at any time after destruction of the enzyme but we have found it advantageous to add them while the solution is at a high temperature at which these substances are more readily dissolved.

The starch used in making the new composite adhesives may be the ordinary kinds of starch commonly used in making starch adhesives, including tapioca starch, corn starch, potato starch, sago starch, etc.

The enzymes used in converting the starch are amylolytic enzymes such as amylase and we have used with advantage the amylolytic enzyme marketed under the trade name Vanzyme.

Enzymes are specific cell-independent, biochemical catalysts which are produced by the living cell but whose action is independent of the living cell and which are destroyed if their solutions are heated long enough. Amylases are enzymes which catalyze the hydrolysis or conversion of starch into maltose, but along with this converting action there seems to be another action, namely that of liquefying the starch, as above pointed out. Advantage is taken of the catalytic action of amylase in producing the enzyme-converted starch; and advantage is taken of the fact that the enzymes are destroyed by heating to prevent further enzyme-conversion of the converted starch before the further addition of the starch which is subsequently gelatinized without conversion.

In making the adhesives we find it advantageous to first make a mixture of water and one of the starches above mentioned containing from 5 to 50% of starch by weight and to then add the amylolytic enzyme to this mixture in amounts of from ⅛% to 3% of the weight of the starch, depending upon the type of starch used, the percent solids, and the desired viscosity, in the enzyme-converted paste. The starch-water-enzyme mixture is then heated to above the gelatinizing point of the starch and is held at this temperature to permit the action of the enzyme for a sufficient period of time, depending upon the viscosity desired for the enzyme-converted paste. In general the longer the mixture is held at this temperature and the longer the enzyme action continues the thinner or less viscous the paste will be. The conversion is carried to a point such that the enzyme converted starch paste will have a viscosity substantially less than that desired in the final adhesive composition. After the paste has thus been thinned down to the desired viscosity the temperature is increased, e. g. to about 195° F. to destroy the enzyme and thereby prevent further enzyme conversion, and action of the enzyme on the subsequently added raw starch.

In order to incorporate the raw starch the enzyme-converted starch solution is advantageously cooled to below the gelatinizing point of the starch before the raw starch is added, and an additional quantity of raw starch is then added. The amount of the added starch can be varied and regulated and will depend, for example, on the viscosity of the enzyme-converted starch solution and the viscosity desired in the resulting composite starch paste. The weight of this added starch may amount, for example, to from 1 to 50% of the weight of the original starch. After this added starch is added and uniformly admixed with the solution the mixture is then heated to above the gelatinizing point of the added raw starch to bring about its gelatinization throughout the mixture, thus materially increasing the viscosity of the mixture as compared with that of the enzyme-converted starch solution.

In order to increase the tackiness of the paste an amount of borax or other alkaline material is advantageously added at this point and while the solution is still warm after gelatinization. When borax is used it has been found that from 1 to 10% of borax produces the desired amount of tackiness. The borax also tends to thicken the paste or increase its viscosity. However this addition of borax or other alkaline material is not essential for certain types of pastes and for certain purposes.

In view of the fact that starches often contain spore-forming soil bacteria which produce enzymes and tend to act upon or thin out or decrease the viscosity of the composite product it is desirable to add formaldehyde or some other substance having similar anitseptic or preserving action.

We have also found it advantageous to add a small quantity of borax or other alkaline material to the starch-water-enzyme mixture at the start of the cook and to adjust the pH of the solution to slightly on the alkaline side. We have found that this tends to decrease the sugar content of the final paste and to increase the adhesiveness of the composite paste.

In making the new paste the cooking and mixing operations can be carried out in any suitable or convenient type of tank or receptacle. It should advantageously be provided with good agitation and the apparatus may be heated, for example, by direct steam or by indirect steam in steam coils.

The new composite starch paste products are particularly advantageous for use in making laminated paper board where a high content of starch is required and where the adhesive must also have a regulated viscosity. The new composite adhesives may also be used for other purposes such as for miscellaneous pasting operations, e. g., pasting roll wrappers on rolls of paper, pasting the ends of corrugated boxes, and in connection with the making of corrugated paper board. The new composite adhesives are also suitable for use as adhesives in the manufacture of coated papers and they may be used in size tubs in paper machines for the surface sizing of paper such as bond papers, offset papers, etc. It will be evident that by varying the degree of conversion of the starch with enzyme and the resulting thinness and viscosity and other properties of the enzyme-converted component of the composite product, and by varying the proportion of added raw starch which is subsequently gelatinized, composite products can be produced having a considerable range of properties and adapted for use for various purposes.

The invention will be further illustrated by the following specific examples but it will be understood that the invention is not limited thereto.

*Example 1.*—An adhesive which may be used with advantage in the manufacture of laminated paper board is made by the following method: 30 pounds of amylase (Vanzyme) are added to a mixture containing 3000 pounds of tapioca starch and 12,800 pounds of water. 1/10% of borax, based on the weight of the starch, is then added to adjust the pH slightly toward the alkaline side. (The pH value of the mixture may still be slightly acid.) The mixture is thoroughly agitated and heated with indirect steam to about 160° F., about 50 minutes, for example, being required to heat the mixture to this temperature. The mixture is then maintained at 160° F. for about 30 minutes, and the temperature is then raised to about 195° F. to destroy the enzyme, about 60 minutes, for example, are required to bring the temperature from 160° F. to 195° F., the total cooking time being about 140 minutes.

The starch solution is then cooled to about 135° F., and about 300 pounds of raw starch are added and thoroughly mixed with the solution. The temperature is then increased to about 165° F. to gelatinize the added starch. About 150 pounds of borax are then added to increase the tack of the mixture.

*Example 2.*—Another adhesive which may be used with advantage in the manufacture of laminated paper board is made by the following method: About 10 pounds of amylase (Vanzyme) are added to a mixture containing about 3000 pounds of tapioca starch and about 12,800 pounds of water. The mixture is agitated and heated to about 160° F., the mixture being, for example, heated at such a rate that it requires about 50 minutes to attain this temperature. If the viscosity of the mixture is too high when this temperature is reached, it will be necessary to continue heating the mixture at this temperature until the viscosity is sufficiently reduced. When the desired viscosity has been attained, the mixture is heated to about 195° F. to destroy the enzyme, the heating being carried out, for example, at such a rate that it requires about 70 minutes to raise the temperature from 160° F. to 195° F. The solution is then cooled to about 135° F. and 880 pounds of raw starch are added. The temperature is then increased to about 165°

F. to gelatinize the added raw starch. 300 pounds of borax are then added. 2 quarts of formaldehyde are also added in order to preserve the adhesive.

*Example 3.*—Another adhesive composition which may be used with advantage for manufacturing laminated paper board is made by the following method: About 3 pounds of amylase (Vanzyme) are added to a mixture containing about 200 pounds of raw corn starch and about 800 pounds of water. The mixture is heated to about 160° F. and maintained at this temperature for about 30 minutes. The temperature is then increased to about 195° F., the time for carrying out this heating step being, for example, about 60 minutes. The total cooking time may be about 2½ hours. The mixture is then cooled to about 135° F., and about 20 pounds of raw starch are added. The temperature is then increased to about 160° F. in order to gelatinize the raw starch. 10 pounds of borax are then added to improve the tackiness of the adhesive.

*Example 4.*—A mixture which may be used with advantage in tub sizing paper is made by the following method: About 4 pounds of amylase (Vanzyme) are added to a mixture containing about 800 pounds of tapioca starch and 8300 pounds of water. The pH value of the mixture is adjusted to about 7.1 by the addition of about ½ pound of borax. The mixture is then heated to about 160° F. by direct steam using only the steam jets for agitation. The heating process may require, e. g., about 15 minutes. The mixture is held at 160° F. for about 15 minutes and is then heated to about 195° F., the time required to heat the mixture from 160° F. to 195° F. being, for example, about 10 minutes. The mixture is then cooled to about 135° F. and about 80 pounds of raw starch are added. The temperature is then increased to about 165° F. to gelatinize the added raw starch. The resulting mixture may be used in a size tub on a paper machine for tub sizing a sheet of white paper.

It is of course understood that the above examples illustrate our invention but that the invention is not limited thereto. The proportions of starch, water and enzyme may be varied over a considerable range, and the method of heating the adhesive mixture may be varied considerably without departing from our invention. The amounts of other materials such as borax or formaldehyde may also be varied.

We claim:

1. The method of making an adhesive composition which comprises mixing starch and water with an amylolytic enzyme, heating said mixture above the gelatinizing temperature of the starch but below the temperature at which the enzyme is destroyed, said heating being continued until the mixture has attained a viscosity substantially less than that desired in the adhesive composition, then heating said mixture at a temperature sufficiently high to destroy the enzyme, cooling the mixture below the gelatinizing temperature of the starch, adding raw starch and then heating the mixture to gelatinize the added raw starch.

2. The method of making an adhesive composition which comprises adding amylase to a mixture of starch and water containing from about 5 to about 50% by weight of starch, the amount of amylase being from about ⅛% to about 3% by weight of the starch, heating the resulting mixture above the gelatinizing temperature of the starch but below the temperature at which the amylase is destroyed, said heating being continued until the mixture has attained a viscosity substantially less than that desired in the adhesive composition, then heating said mixture at a temperature sufficiently high to destroy the amylase, cooling the mixture below the gelatinizing temperature of the starch, adding raw starch, the amount of raw starch being from about 1% to about 50% of the weight of the starch originally in the mixture, and then heating the mixture to gelatinize the raw starch.

3. The method of making an adhesive composition which comprises mixing starch and water with an amylolytic enzyme, adjusting the pH value of the resulting mixture to about 7, and heating said mixture above the gelatinizing temperature of the starch but below the temperature at which the enzyme is destroyed, said heating being continued until the mixture has attained a viscosity substantially less than that desired in the adhesive composition, then heating said mixture at a temperature sufficiently high to destroy the enzyme, cooling the mixture below the gelatinizing temperature of the starch, adding raw starch and then heating the mixture to gelatinize the added raw starch.

4. The method of making adhesive compositions which comprises incorporating a relatively small proportion of raw starch with a major proportion of enzyme-converted starch having a viscosity substantially less than that of the adhesive composition, said incorporation being at a temperature below that of gelatinization of the added starch, and heating the resulting mixture to gelatinize the added raw starch and to increase the viscosity.

5. The method of making adhesive compositions which comprises adding raw starch to enzyme-converted starch having a viscosity substantially less than that of the adhesive composition, the added raw starch being less than 50% of the weight of the enzyme-converted starch and the addition being made below the temperature of gelatinization, and heating the mixture of raw starch and enzyme-converted starch to gelatinize the added raw starch.

6. Adhesive compositions produced by the process of claim 4.

CHARLES H. CHAMPION.
FRED H. DENHAM.